(12) United States Patent
Kobayashi

(10) Patent No.: US 10,967,607 B2
(45) Date of Patent: Apr. 6, 2021

(54) BASE MATERIAL NONWOVEN FABRIC FOR MOLDING AND MOLDED PRODUCT OBTAINED BY THE SAME

(71) Applicant: JAPAN VILENE COMPANY, LTD., Tokyo (JP)

(72) Inventor: Masaki Kobayashi, Shiga (JP)

(73) Assignee: JAPAN VILENE COMPANY, LTD., Tokyo (JP)

(*) Notice: Subject to any disclaimer, the term of this patent is extended or adjusted under 35 U.S.C. 154(b) by 190 days.

(21) Appl. No.: 16/200,847

(22) Filed: Nov. 27, 2018

(65) Prior Publication Data
US 2019/0160780 A1 May 30, 2019

(30) Foreign Application Priority Data

Nov. 27, 2017 (JP) .............................. JP2017-226429
May 23, 2018 (JP) .............................. JP2018-098959
Oct. 1, 2018 (JP) .............................. JP2018-186811

(51) Int. Cl.
| | |
|---|---|
| *B32B 27/12* | (2006.01) |
| *B32B 27/32* | (2006.01) |
| *B32B 5/26* | (2006.01) |
| *B32B 5/02* | (2006.01) |
| *D04H 1/559* | (2012.01) |
| *D04H 3/011* | (2012.01) |
| *D04H 1/435* | (2012.01) |
| *D04H 1/558* | (2012.01) |

(52) U.S. Cl.
CPC ................ *B32B 5/26* (2013.01); *B32B 5/022* (2013.01); *B32B 27/12* (2013.01); *B32B 27/32* (2013.01); *D04H 1/435* (2013.01); *D04H 1/558* (2013.01); *D04H 1/559* (2013.01); *D04H 3/011* (2013.01); *B32B 2262/0276* (2013.01); *B32B 2323/10* (2013.01)

(58) Field of Classification Search
None
See application file for complete search history.

(56) References Cited

U.S. PATENT DOCUMENTS

2014/0070562 A1   3/2014   Inagaki

FOREIGN PATENT DOCUMENTS

| | | |
|---|---|---|
| DE | 202014010826 U1 | 12/2016 |
| JP | 2012245925 A | 12/2012 |
| WO | 2016160264 A1 | 10/2016 |

*Primary Examiner* — Shawn Mckinnon
(74) *Attorney, Agent, or Firm* — Heslin Rothenberg Farley & Mesiti P.C.

(57) ABSTRACT

An object is to realize a base material nonwoven fabric for molding excellent in handling as a material, by preventing peeling between laminated components constituting the base material for molding; and even after the base material is reheated and molded, to provide a molded product having excellent elasticity resistant to external forces such as flying debris or the like, and while maintaining peeling resistance, capable of realizing excellent sound absorbing characteristics, by suppressing air permeability inhibition due to the adhesive component. A base material nonwoven fabric for molding in a predetermined shape by heat molding, characterized by having a two-layer structure of a long fiber nonwoven fabric layer comprising at least a polyester resin and a short fiber nonwoven fabric layer comprising a polyester resin, wherein a flow-solidified undrawn polypropylene layer is localized in the vicinity of an interface between the long fiber nonwoven fabric layer and the short fiber nonwoven fabric layer.

2 Claims, 5 Drawing Sheets

BASE MATERIAL NONWOVEN FABRIC FOR MOLDING AND MOLDED PRODUCT OBTAINED BY THE SAME

TECHNICAL FIELD

The present invention relates to a base material nonwoven fabric for molding, and a molded product thereof, suitable for underbody shielding material, which is attached to the lower part of the body, tire housing, or the like, of a car.

BACKGROUND ART

Underbody shielding materials are used everywhere on an auto body in order to reduce the unevenness of the underside of the auto body to minimize air resistance during movement, or to protect the auto body from flying debris scattered by tires.

As an example, JP 2012-245925 (Patent literature 1) proposes a body undercover for autos to be placed on the underside of the body of a car (hereinafter collectively referred to as underbody shielding material, and sometimes abbreviated as UBS). In this technology, a fiber molded product comprising at least: a base material layer, in which a fiber reinforcing material comprising an inorganic fiber such as a fiberglass or the like, and a first thermoplastic synthetic resin are mixed; and a nonwoven fabric layer of a thermoplastic synthetic fiber, both the layers being laminated, surface portions of both the layers being bonded by thermal fusion, and both the layers being compression-molded into a predetermined shape, is disclosed. The first thermoplastic synthetic resin of the base material layer has a melting point for melting in a heating process at the time of molding, and the nonwoven fabric layer includes a mixture of a second thermoplastic synthetic fiber having a melting point for melting in the heating process at the time of molding and a third thermoplastic synthetic fiber having a melting point for non-melting in the heating process at the time of molding.

In this technology, it is disclosed that since the first and the second thermoplastic synthetic resins are used for interlayer adhesion, it is possible to realize a UBS having a higher air permeability and excellent sound absorbing characteristics than when using an adhesive film.

As another UBS technology which does not use such an adhesive film, WO 2016/160264 (Patent literature 2) proposes a composite material technology for UBS comprising providing a first nonwoven fabric and a third nonwoven fabric of spunbond polyester comprising at least 50% by weight of an ester of an aromatic carboxylic acid, and a second nonwoven fabric obtained by entangling polyester staple fibers by needle punching; sandwiching the second nonwoven fabric between the first nonwoven fabric and the third nonwoven fabric; and entangling and integrating the laminate by needle punching. In the technology of this publication, an embodiment in which, as the polyester fibers constituting each layer, composite fibers, such as a sheath-core type or the like, are adopted for adhesion is disclosed. It is disclosed that, by applying this technology, peeling resistance can be given, because it is possible to bond fibers by needle punching in a state where their fiber components are oriented in the thickness direction between two layers in contact with each other at the interface; and that air permeability is unimpaired, and excellent sound absorbing characteristics are exhibited, because no film is used as an adhesive component.

CITATION LIST

Patent Literature

[Patent literature 1] JP 2012-245925 ([Claims], [0015]-[0017], [0020], [0021], [Examples], [FIG. 1], and the like)

[Patent literature 2] WO 2016/160264 ([Claims], [Abstract], page 2, line 15 to page 4, line 12, page 5, line 1 to line 11 of the publication, FIG. 1, and the like)

SUMMARY OF INVENTION

Technical Problem

In the above two background arts, since no film is used for interlayer adhesion when constructing a base material for UBS having a laminated structure, it is possible to sufficiently impart the air permeability which contributes to the sound absorbing properties of a molded product. However, since Patent literatures 1 and 2 utilize a method in which one of two types of fibers having different melting points is completely melted for adhesion, or a composite-type adhesive fiber uniformly blended in a nonwoven fabric layer, there is a problem that the density of the adhesive component between the layers cannot be sufficiently taken, and that peeling is liable to occur even if needle punching or the like is used together.

Further, since polyester-based composite fibers used, for example, for adhesion by the first and second thermoplastic resins disclosed in Patent literature 1, or for thermal adhesion in Patent literature 2, are widely distributed in the nonwoven fabric layer, it was sometimes difficult, in USB after heat molding, to balance both prevention of peeling and impartment of elasticity to the molded product.

Therefore, an object of the present invention is to provide a base material excellent in handling as a material, by preventing peeling between laminated components constituting the base material; and, even after the base material is reheated and molded, to provide a molded product having excellent elasticity resistant to external forces such as flying debris or the like, and while maintaining peeling resistance, capable of realizing excellent sound absorbing characteristics, by suppressing air permeability inhibition due to the adhesive component.

Solution to Problem

In view of the problems of these prior arts, the inventor has conducted intensive studies, and has found that a nonwoven fabric, in which a sheet-like undrawn polypropylene (CPP: cast polypropylene) resin is sandwiched between layers as a raw material to prepare a laminated structure, and thermal adhesion is performed to fluidize the resin sheet and localize it in each nonwoven fabric layer, can be realized.

In order to resolve the object, the present invention relates to a base material nonwoven fabric for molding in a predetermined shape by heat molding, characterized by having at least a two-layer structure of a long fiber nonwoven fabric layer comprising a polyester resin and a short fiber nonwoven fabric layer comprising a polyester resin, wherein a flow-solidified undrawn polypropylene layer is localized at an interface between the above long fiber nonwoven fabric layer and the above short fiber nonwoven fabric layer. The term "be localized" as used herein represents a state where a sheet-like undrawn polypropylene resin is positioned between the layers of the two nonwoven fabric layers to be bonded, and the resin is fluidized by heating, and the undrawn polypropylene resin is adhered and solidified among the constituent fibers of these nonwoven fabric layers in the form that will be described in detail below.

In carrying out the present invention, the resin constituting the above undrawn polypropylene layer is preferably a polypropylene resin having an MFR (melt flow rate) of 20 [g/10 min.] or more (230 [° C.], 2.16 [Kg]) measured according to JIS K6921-2.

Further, a molded product obtained by using the above base material of the present invention has a flexural modulus defined in JIS K7171 of 110 [MPa] or more.

Advantageous Effects of Invention

In the constitution of the present invention, a sheet-like undrawn polypropylene resin, as a raw material used for interlayer adhesion, is fluidized by heating to localize between the layers, and is present as an air-permeable undrawn polypropylene layer. Therefore, it is possible to provide a molded product, such as UBS or the like, which exhibits excellent sound absorbing properties, high peeling strength, and excellent elasticity to external force, by heat-molding the base material nonwoven fabric for molding according to the present invention into a desired shape.

DESCRIPTION OF EMBODIMENTS

Hereinafter, preferred embodiments of the base material nonwoven fabric for molding of the present invention will be explained according to the manufacturing procedure thereof, with reference to the drawings. In connection with this, the following description is based on specific conditions, such as concrete shapes, numerical conditions, arrangement relationships, and the like, to the extent that the present invention can be understood, but the present is not limited to these exemplified conditions.

Figure 1:
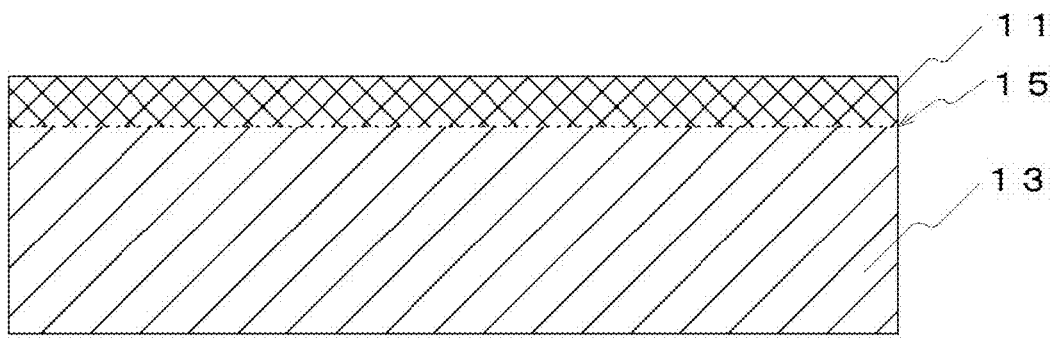
FIG. 1 is an explanatory drawing showing a schematic outline cross-section of a base material nonwoven fabric for molding, in order to explain a preferred embodiment of the present invention.

FIG. 1 is an explanatory drawing showing a preferred embodiment of the present invention by a schematic outline cross-section. In the illustrated preferred embodiment, a constitution in which a two-layer structure of a long fiber nonwoven fabric layer 11 comprising a polyester resin and a short fiber nonwoven fabric layer 13 comprising a polyester resin is a main component, and a heat-fused undrawn polypropylene layer 15, which is shown by a dotted line, is localized at the interface between the long fiber nonwoven fabric layer 11 and the short fiber nonwoven fabric layer 13, is adopted.

The term "short fiber" as used herein refers to a fiber having a fiber length of 100 mm or less.

The term "long fiber" as used herein refers to a fiber having a fiber length longer than 100 mm. In addition, since the fiber length is longer than 100 mm, the fiber whose fiber length is difficult to specify is also regarded as a "long fiber".

The term "fiber length" refers to the fiber length measured in accordance with JIS L 1015 (2010), 8.4.1 c) direct method (C method).

First, the long fiber nonwoven fabric layer 11 comprising a polyester resin and the short fiber nonwoven fabric layer 13 comprising a polyester resin are provided.

As disclosed in Patent literature 1, it is considered that a USB excellent in rigidity and heat resistance can be provided by heat-molding a base material nonwoven fabric for molding with a fiber layer comprising an inorganic fiber, such as a fiberglass or the like. However, in comparison with a base material nonwoven fabric for molding with a fiber layer of an organic resin fiber, in the base material nonwoven fabric for molding with the fiber layer of the same weight composed of an inorganic fiber having heavy specific gravity, since the number of fibers constituting the fiber layer is small, the number of bonding points between the fibers is small. Therefore, in comparison with the base material nonwoven fabric for molding with the fiber layer of an organic resin fiber, the base material nonwoven fabric for molding with the fiber layer of the same weight comprising an inorganic fiber is inferior in handling, and it is difficult to provide a molded product excellent in elasticity and peeling resistance.

Therefore, since a base material nonwoven fabric for molding which satisfies heat resistance required in the field of automobile materials and is excellent in handling can be provided, and a molded product excellent in elasticity and peeling resistance can be realized, the constituent fibers of the long fiber nonwoven fabric layer 11 and the short fiber nonwoven fabric layer 13 preferably comprise a polyester-based resin, and are more preferably composed of a polyester-based resin alone.

As the polyester-based resin, a fiber comprising a resin having a melting point of at least 230° C. or more is preferable, so that the base material nonwoven fabric for molding and the molded product of the present invention have heat resistance required in the field of automobile materials, and both components may be the same polyester-based resin, or different polyester-based resins. As examples, similarly to the above-mentioned Patent literature 2, linear polyester obtained by polycondensation of an aromatic dicarboxylic acid component and a diol component, branched copolyester obtained by copolymerization of the linear polyester and a branching-forming component having at least three ester-forming groups (for example, a hydroxyl group, a carboxyl group, or the like), or the like, may be used. As the aromatic dicarboxylic acid component, which is one of the polycondensation components of the linear polyester, for example, terephthalic acid, isophthalic acid, naphthalene dicarboxylic acid, diphenyl ether dicarboxylic acid, diphenyl sulfone dicarboxylic acid, diphenoxy ethane dicarboxylic acid, or the like, may be used alone, or as a mixture of two or more. As the diol component, which is the other polycondensation component, for example, ethylene glycol, propylene glycol, butanediol, neopentylene glycol, hexamethylene glycol, cyclohexane dimethylol, tricyclodecanedimethylol, 2,2-bis(4-β-hydroxyethoxyphenyl)propane, 4,4-bis(β-hydroxyethoxy)diphenylsulfone, or the like, may be used alone, or as a mixture of two or more. As the branching-forming component, for example, tri- or tetracarboxylic acids (for example, trimellitic acid, pyromellitic acid, or the like) or lower alkyl esters thereof, tri- or tetraols (for example, glycerin, trimethylolpropane, trimethylolethane, pentaerythritol, or the like), hydroxycarboxylic acids (for example, dihydroxycarboxylic acid, hydroxycarboxylic acid, or the like), or derivatives of these compounds, or the like, may be used alone, or as a mixture of two or more.

The long fiber nonwoven fabric layer 11 comprising the above-mentioned polyester-based resin is a component that can be the outermost layer in the instance of UBS, and it is preferable that it is excellent in tear resistance and scratch resistance, and therefore, it is preferably a long fiber nonwoven fabric prepared by a spunbond method or the like. The mass per unit area is preferably 30 [g/m$^2$] or more, and more preferably 90 [g/m$^2$] or more, so that it is bonded to the short fiber nonwoven fabric layer 13 by the undrawn polypropylene layer 15, and its surface has a good texture. When the mass per unit area is too high, the elongation is poor and the moldability decreases, the mass per unit area is preferably 200 [g/m$^2$] or less.

The short fiber nonwoven fabric layer 13 comprising the polyester-based resin is a component that is required to have traceability, elasticity, and the like, when molding USB or using USB. Therefore, a nonwoven fabric in which fibers are gently bonded is preferable, and a short fiber nonwoven fabric prepared by forming a web by a card method and applying a needle punching method to the web is preferable. The mass per unit area of the short fiber nonwoven fabric is preferably 500 [g/m$^2$] or more, and more preferably 900 [g/m$^2$] or more. Since excessive mass per unit area requires extension of heating time during molding, and leads to an increase in cost, the mass per unit area is preferably 2000 [g/m$^2$] or less.

The undrawn polypropylene layer 15 in the present invention plays the role of adhering both layers of the long fiber nonwoven fabric layer 11 and the short fiber nonwoven fabric layer 13.

The reason why the component that bonds both layers is polypropylene resin, is first, that the polypropylene resin is a thermoplastic resin, and it flows when heated and easily permeates into the inside of the nonwoven fabric layers, and therefore, peel strength between both layers can be improved by strongly bonding the long fiber nonwoven fabric layer 11 and the short fiber nonwoven fabric layer 13. Secondly, that is because the melting point of the polypropylene resin is higher than 100° C., and therefore, a molded product satisfying the heat resistance required in the field of automobile materials (for example, no interlayer peeling caused by melting of a component bonding both layers under 100° C. atmosphere occurs) can be provided. For example, in a molded product in which both layers are bonded with an EVA resin or the like having a melting point of 100° C. or less, the EVA resin that bonds both layers melts under 100° C. atmosphere, and interlayer peeling tends to occur.

Further, the reason why the polypropylene resin that bonds both layers is an undrawn polypropylene resin is that the base material nonwoven fabric for molding of the present invention can be realized, and a molded product excellent in elasticity can be provided, as described below.

In order to demonstrate the above effects more effectively, the component that bonds both layers of the long fiber nonwoven fabric layer 11 and the short fiber nonwoven fabric layer 13 in the undrawn polypropylene layer 15 is preferably an undrawn polypropylene resin alone.

On the other hand, as a result of examination by the present applicant, it was found that in a base material nonwoven fabric for molding prepared by intervening a drawn polypropylene (OPP: oriented polypropylene) resin between the long fiber nonwoven fabric layer 11 and the short fiber nonwoven fabric layer 13, the drawn polypropylene resin shrank upon heating, and wrinkles occurred on the surface, as described below. In particular, in a base material nonwoven fabric for molding prepared by intervening a sheet-like drawn polypropylene resin therebetween, large wrinkles that prevent the preparation of a molded product occur. Further, wrinkles also occur in a base material nonwoven fabric for molding prepared by intervening a fiber sheet (for example, a spunbond nonwoven fabric or the like) prepared by drawing a polypropylene resin.

When such a base material nonwoven fabric for molding with wrinkles on the surface was used to prepare a molded product, wrinkles also occurred on the main surface of the prepared molded product. Since such a molded product with wrinkles has low flexural modulus, and is poor in resistance to force acting in the thickness direction, as long as the base material nonwoven fabric for molding prepared by intervening a drawn polypropylene is used, it is difficult to provide a molded product excellent in elasticity.

Next, a commercially available polypropylene resin is provided, and is supplied between the above-mentioned long fiber nonwoven fabric layer 11 and the short fiber nonwoven fabric layer 13 in an undrawn and sheet-like state, using a well-known laminating technique, such as T die or the like.

The embodiment of a polypropylene resin supplied in an undrawn state may be appropriately selected, and it is preferable to supply it in a film form, so that a base material nonwoven fabric for molding, in which a heat-fluidized undrawn polypropylene layer 15 has a width in a specific range and is uniformly distributed and localized, can be provide, and in order to increase the percentage of the area of the localized polypropylene resin with respect to the main surface area of the long fiber nonwoven fabric layer (more particularly, in order to be higher than 60%). When such an embodiment of the base material nonwoven fabric for molding is heat-molded, and the undrawn polypropylene layer existing between the layers is re-fluidized, the undrawn polypropylene resin easily permeates uniformly into the inside of the nonwoven fabric layers from the interface between the nonwoven fabric layers. As a result, it is preferable, because a molded product more excellent in peel strength and elasticity can be provided.

The percentage of the area of the localized polypropylene resin with respect to the main surface area of the long fiber nonwoven fabric layer may be appropriately adjusted, but it is preferably higher than 60%, more preferably 65% or more, still more preferably 70% or more, still more preferably 75% or more, still more preferably 80% or more, still more preferably 85% or more, still more preferably 90% or more, and still more preferably 95% or more, In connection with this, when the embodiment of the supplied polypropylene resin is powder, or a fiber sheet or a web such as a spunbond nonwoven fabric or the like, the polypropylene resin, which is flow-solidified by the process of thermal adhesion, cannot have a width in a specific range and cannot be distributed, and it is difficult to provide the base material nonwoven fabric for molding of the embodiment in which the percentage of the area of the localized polypropylene resin with respect to the main surface area of the long fiber nonwoven fabric layer is high (more particularly, an embodiment higher than 60%). As a result, it is difficult to provide a molded product more excellent in peel strength and elasticity.

In connection with this, the undrawn polypropylene layer in the present invention may contain additives other than the above-mentioned polypropylene resin, such as a fire retardant, an antioxidant, or the like.

The present inventor found that when the components of UBS (for example, in UBS having a laminated structure, a constituent resin or the like that bonds the interlayer of the USB) were inferior in heat resistance, there was a problem that part of the USB peeled off, for example, interlayer peeling occurred in the UBS, or the like, under high temperature conditions, such as a midsummer day or the like. In such UBS in which part thereof peels off, various functions, for example, an effect of reducing the unevenness of the underside of the auto body of a car to suppress the air resistance during traveling, protection of the auto body from flying debris scattered by the tire, sound absorbing performance, or the like, deteriorate.

As a result of the continuing examination by the present applicant, it has been found that, in the base material nonwoven fabric for molding with the constitution of the present invention, UBS which is excellent in heat resistance and prevents the occurrence of interlayer peeling can be provided, when the undrawn polypropylene resin layer contains a polypropylene resin blended with an antioxidant.

The type of antioxidant may be appropriately selected in order to achieve the above-mentioned object, but a phenol-type antioxidant, a phosphorus-type antioxidant, a complex-type antioxidant of phosphorus and phenol, or the like, can be used.

The amount of antioxidant blended in the polypropylene resin may be appropriately adjusted in order to achieve the above-mentioned object, but the percentage of the solid content mass of the antioxidant with respect to the solid content mass of the polypropylene resin may be 0.1% to 5%, may be 0.5% to 4%, and may be 1% to 3%.

The proportion of polypropylene resin blended with the antioxidant contained in the undrawn polypropylene layer in the present invention may be appropriately adjusted, but it is preferable that the undrawn polypropylene layer in the present invention is composed of the polypropylene blended with the antioxidant alone, in order to achieve the above-mentioned object effectively.

After this, using a well-known calender or the like, the polypropylene resin supplied in an undrawn and sheet-like state is thermal pressed to localize the undrawn polypropylene layer between the above-mentioned two nonwoven fabric layers, and to perform temporary adhesion prior to molding. The localized state of the undrawn polypropylene layer varies depending on heating time, temperature, presence or absence of pressurization, and MFR of the polypropylene resin. In the constitution of the present invention, when the measurement is carried out according to JIS K6921-2, it is preferable to select a polypropylene resin having an MFR of 20 [g/10 min.] or more (230 [° C.], 2.16 [Kg]: hereinafter, the description of measurement conditions is omitted). When the MFR is too high, since the flowability of the undrawn polypropylene layer becomes remarkably high, the air permeability as the base material nonwoven fabric for molding tends to increase, the sound absorbing characteristics in the low frequency range tend to deteriorate, and the peeling strength between the long fiber nonwoven fabric layer and the short fiber nonwoven fabric layer also tends to decrease. Therefore, the MFR of the resin constituting the undrawn polypropylene layer in consideration of peel strength and sound absorbing characteristics is preferably 40 [g/10 min.] or less. The localized state will be explained with reference to the results taken using an optical microscope in the Examples below.

To the base material nonwoven fabric for molding, in which the temporary adhesion has been applied, a conventional molding technology, such as cooling after heating, may be applied to prepare a molded product. In the molded product of the present invention, when the flexural modulus defined in JIS K7171 is determined, it is preferably 110 [MPa] or more, and more preferably 120 [MPa] or more.

As the molded product obtained using the base material nonwoven fabric for molding of the present invention, molding, such as impartment of unevenness (the concave-convex shape) or the like, may be applied depending on the shape design of UBS. Therefore, in order to improve form stability of convex shapes and concave shapes by making the base material nonwoven fabric for molding a symmetrical laminated structure in thickness direction, a symmetrical laminated structure in which the long fiber nonwoven fabric layers are positioned on both sides, and the short fiber nonwoven fabric layer is positioned between the long fiber nonwoven fabric layers with the undrawn polypropylene layers sandwiched between the short fiber nonwoven fabric layer is preferable. These numerical conditions, arrangement relationships, and other conditions are not the above-mentioned specific conditions, and various changes and modifications obvious to those skilled in the art are possible without departing from the scope of the appended claims.

EXAMPLES

Hereinafter, evaluation results of the examples of preferred embodiments of the present invention will be illustrated.

In the following examples and comparative examples, evaluation results of base material nonwoven fabrics for molding having a five-layer structure without front and back sides due to symmetry during molding, i.e., base material nonwoven fabrics for molding in which the long fiber nonwoven fabric layers 11 are bonded on both sides of the short fiber nonwoven fabric layer 13 by the polypropylene layers, and molded products prepared using the same, will be shown.

Examples 1 to 3, Comparative Examples 1 to 2

First, a commercially available spunbond nonwoven fabric (long fiber nonwoven fabric) composed of a polyethylene terephthalate resin (melting point: 255° C., hereinafter referred to as a PET resin) and having a mass per unit area of 90 [g/m²] was provided. Polypropylene resins (hereinafter referred to as a PP resin, melting point: 160° C.) having various MFRS shown in Table 1 were laminated, directly from a T die, on one of the main surfaces of the spunbond nonwoven fabric to dispose a film-like undrawn PP resin layer.

Next, short fibers (fineness: 6.6 [dtex], fiber length: 51 [mm]) made of a PET resin, and sheath-core type short fibers (fineness: 4.4 [dtex], fiber length: 51 [mm]) composed of a core of a PET resin and a sheath of a PET resin (melting point: 180° C.) were provided to form a web by a card machine, and the web was entangled by needle punching to prepare a fiber web having a mass per unit area of 900 [g/m²]. The prepared fiber web was heated in a heating over at 200° C., and cooled to provide a short fiber nonwoven fabric having a thickness of 7 [mm] at a load of 20 [g/cm²].

Next, the long fiber nonwoven fabrics were laminated on both main sides of the short fiber nonwoven fabric, through the PP resin layers laminated on the long fiber nonwoven fabric, and were thermal pressed at 180 [° C.] using a hot rolling machine at a clearance of 6.5 [mm] to obtain a base material nonwoven fabric for molding in which the long fiber nonwoven fabric layers were bonded on both sides of the short fiber nonwoven fabric layer with an undrawn PP resin.

Comparative Example 3

A drawn PP resin film (mass per unit area: 40 g/m², MFR: 9 [g/10 min.], melting point: 160° C.) was laminated on one of the main surfaces of the long fiber nonwoven fabric employed in Examples 1 to 3 and Comparative Examples 1 to 2.

Next, the long fiber nonwoven fabric, the short fiber nonwoven fabric employed in Examples 1 to 3 and Comparative Examples 1 to 2, and the long fiber nonwoven fabric were laminated through the films, and were thermal pressed in a similar fashion to Examples 1 to 3 and Comparative Examples 1 to 2 to obtain a base material nonwoven fabric for molding in which the long fiber nonwoven fabric layers were bonded on both sides of the short fiber nonwoven fabric layer with the PP resin derived from the drawn PP resin films.

Comparative Example 4

A spunbond nonwoven fabric (mass per unit area: 40 g/m², MFR: It is estimated that it is 20 or more and 100 or less, melting point: 160° C.) prepared by thinning and drawing a PP resin was laminated on one of the main surfaces of the long fiber nonwoven fabric employed in Examples 1 to 3 and Comparative Examples 1 to 2.

Next, the long fiber nonwoven fabric, the short fiber nonwoven fabric employed in Examples 1 to 3 and Comparative Examples 1 to 2, and the long fiber nonwoven fabric were laminated through the spunbond nonwoven fabrics, and were thermal pressed in a similar fashion to Examples 1 to 3 and Comparative Examples 1 to 2 to obtain a base material nonwoven fabric for molding in which the long fiber nonwoven fabric layers were bonded on both sides of the short fiber nonwoven fabric layer with the PP resin derived from the PP resin spunbond nonwoven fabrics.

In each of the base material nonwoven fabrics for molding prepared in Examples 1 to 3, a flow-solidified undrawn polypropylene layer was localized in the vicinity of the interface between the long fiber nonwoven fabric layer and the short fiber nonwoven fabric layer. This constitution will be explained with reference to the base material nonwoven fabric for molding prepared in Example 2.

Figure 2:
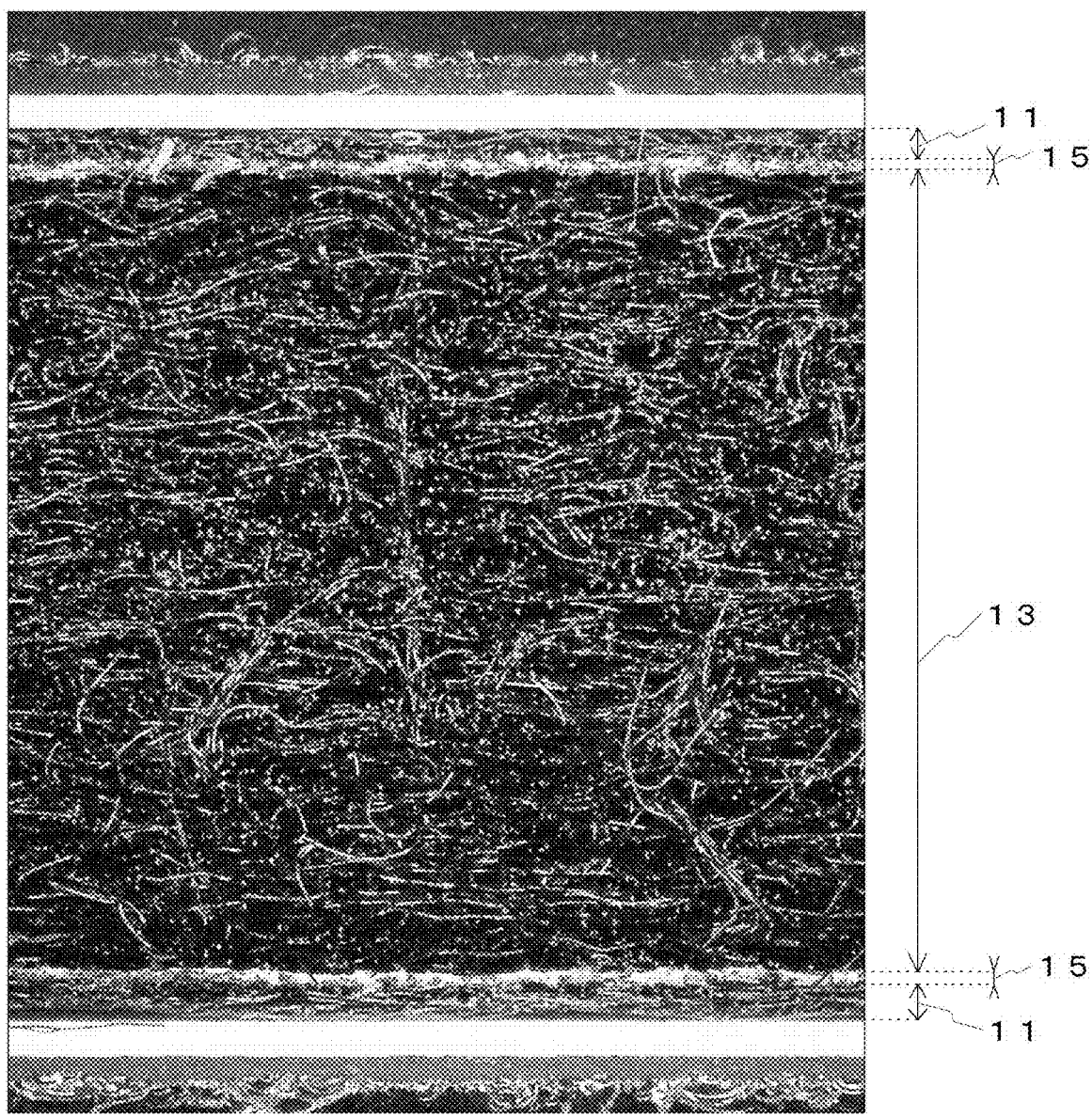
FIG. 2 is a photograph of the cross-section of a base material nonwoven fabric for molding of Example 2, taken using an optical microscope.

As FIG. 2, a photograph, which was taken using an optical microscope, of the cross-section of the above-mentioned base material nonwoven fabric for molding of Example 2 is shown. In FIG. 2, the cross-section was taken using a 30-fold optical microscope in a state where glossy papers for inkjet printing were applied to both sides of the obtained base material nonwoven fabric for molding, and these were held and fixed by sandwiching them between glass plates to prevent the thickness from collapsing. In FIG. 2, the same components as those in FIG. 1 are denoted by the same reference numerals.

As can be understood from the figure, after the undrawn PP resin was laminated with the long fiber nonwoven fabric layer 11, these were thermal pressed in a state where the short fiber nonwoven fabric layer 13 was placed in contact with the undrawn PP resin, and as a result, the sheet-like undrawn PP resin was partially ruptured and localized. It can be understood from FIG. 2 that the nonwoven fabric layers are temporarily bonded to each other with the heat-fluidized drawn PP resin in a state where the resin penetrates mainly into the long fiber nonwoven fabric layer 11 side. In this state, the peel strength was sufficient for handling.

In connection with this, the state where part of the undrawn polypropylene layer 15 is flow-solidified is expressed as "be localized" in the present specification. Although the bar scale is omitted, since the thickness of the above-mentioned glossy paper used for shooting (a portion with a relatively high brightness in contact with the long fiber nonwoven fabric layer 11) is approximately 250 μm, the long fiber nonwoven fabric layer 11 and the short fiber nonwoven fabric layer 13 were temporarily bonded to each other with an apparent thickness of approximately 200 [μm] and a thickness of approximately 5000 [μm], respectively, in the base material nonwoven fabric for molding of Example 2. On this occasion, it can be understood that the heat-fluidized undrawn polypropylene layer 15 is distributed and localized between the layers with a width of 50-80 [μm] (in other words, it has a width in a specific range, and is uniformly distributed).

Figure 4:
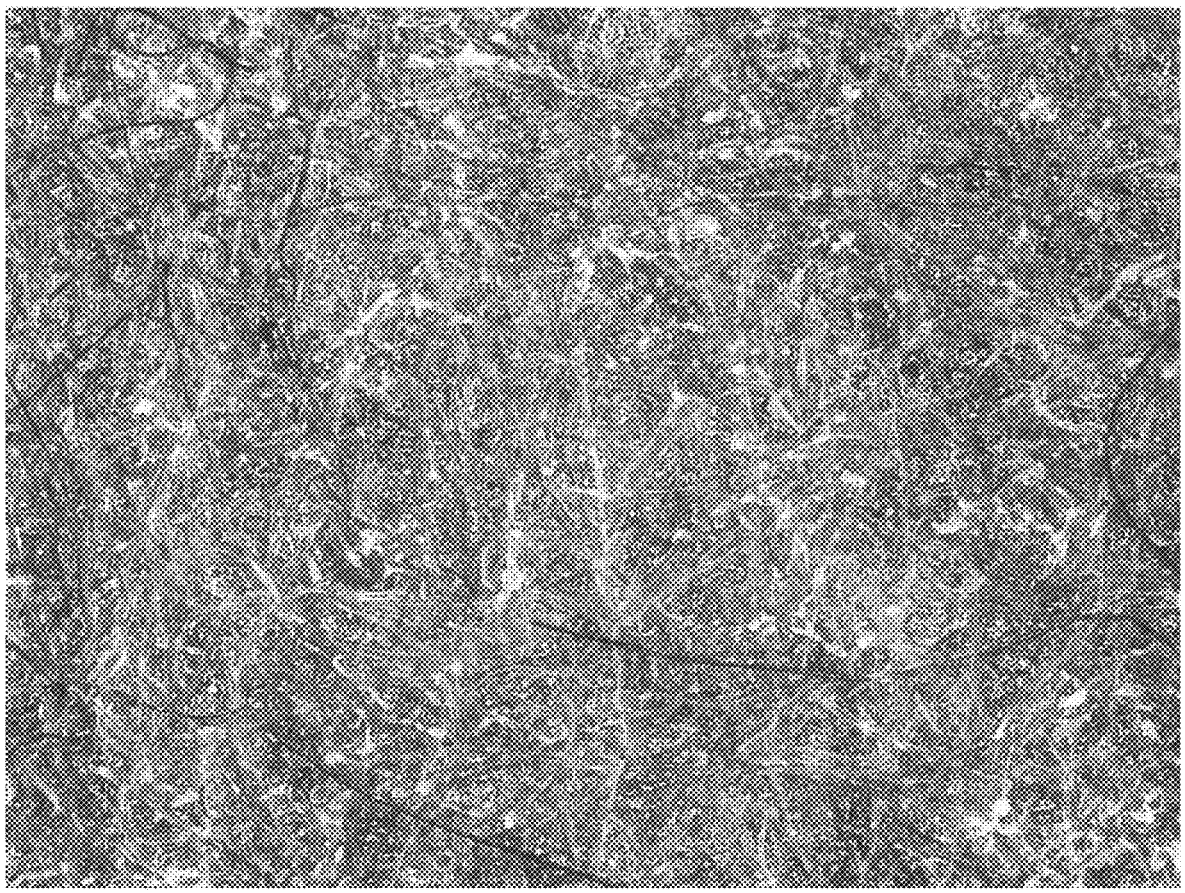
FIG. 4 is a photograph of a polypropylene resin layer, taken from its thickness direction, after peeling a short fiber nonwoven fabric layer from the base material nonwoven fabric for molding of Example 2, using an optical microscope.

Further, the short fiber nonwoven fabric layer was peeled from each of the prepared base material nonwoven fabrics for molding of Examples 1 to 3, and the undrawn PP resin layer found on the long fiber nonwoven fabric layer was observed from the thickness direction, using an optical microscope. As a result, the undrawn PP resin was uniformly distributed and present on the long fiber nonwoven fabric layer. The percentage of the area of the undrawn PP resin with respect to the main surface area of the long fiber nonwoven fabric layer was 95% or more in each Example. As FIG. 4, a photograph of the polypropylene resin layer, the photograph being taken from its thickness direction using an optical microscope, after peeling the short fiber nonwoven fabric layer from the base material nonwoven fabric for molding of Example 2, is shown.

On the other hand, in a similar fashion to the above-mentioned method explained as Example 2, photographs, which were taken using an optical microscope, of the cross-section of the base material nonwoven fabrics for molding prepared in Comparative Examples 1 to 2 were confirmed. As a result, in each of the base material nonwoven fabrics for molding prepared in Comparative Examples 1 to 2, the undrawn PP resin did not penetrate into the inside of the nonwoven fabric layers from the interface between the nonwoven fabric layers, as in each Example, and the sheet-like drawn PP resin was not partially ruptured and localized, but present between both fiber layers.

Therefore, in the base material nonwoven fabrics for molding prepared in Comparative Examples 1 to 2, the flow-solidified undrawn polypropylene layer was not localized in the vicinity of the interface between the long fiber nonwoven fabric layer and the short fiber nonwoven fabric layer.

Figure 5:
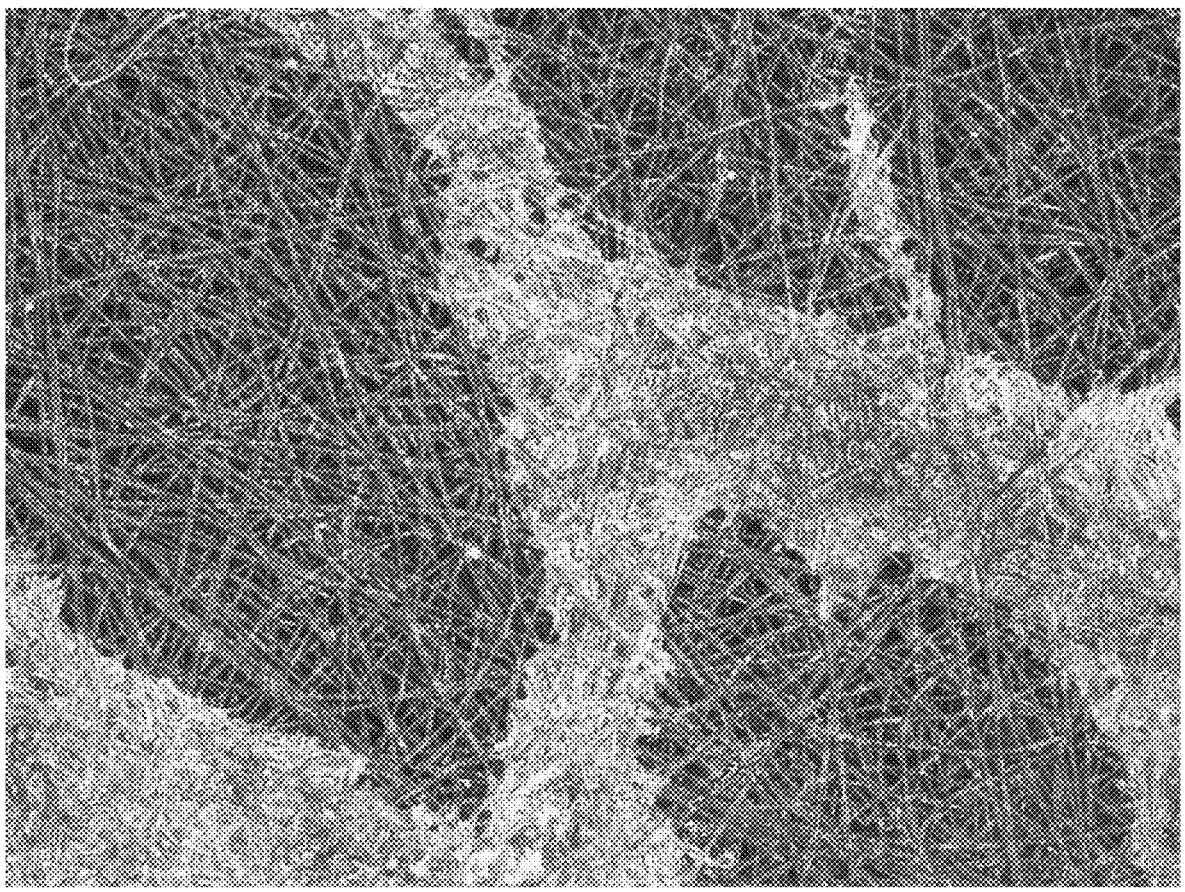
FIG. 5 is a photograph of a polypropylene resin layer, taken from its thickness direction, after peeling a short fiber nonwoven fabric layer from a base material nonwoven fabric for molding of Comparative Example 3, using an optical microscope.

Further, the short fiber nonwoven fabric layer was peeled from the base material nonwoven fabric for molding prepared in Comparative Example 3, and the PP resin layer found on the long fiber nonwoven fabric layer was observed from the thickness direction, using an optical microscope. As a result, the PP resin was not fluidized, and present in a film embodiment having partial cuts, and present without being uniformly distributed on the long fiber nonwoven fabric layer. As FIG. 5, a photograph of the polypropylene resin layer, the photograph being taken from its thickness direction using an optical microscope, after peeling the short fiber nonwoven fabric layer from the base material nonwoven fabric for molding of Comparative Example 3, is shown.

In Comparative Example 3, since the drawn PP resin film shrank greatly during thermal pressing, large wrinkles occurred on the main surfaces of the prepared base material nonwoven fabric for molding. Therefore, the base material nonwoven fabric for molding prepared in Comparative Example 3 could not be used for measurement of peel strength as described below, and peel strength could not be measured. Further, a molded product could not be prepared using the base material nonwoven fabric for molding prepared in Comparative Example 3.

Since the PP resin spunbond nonwoven fabric shrank during thermal pressing in Comparative Example 4, wrinkles occurred on the main surfaces of the prepared base material nonwoven fabric for molding.

Figure 6:
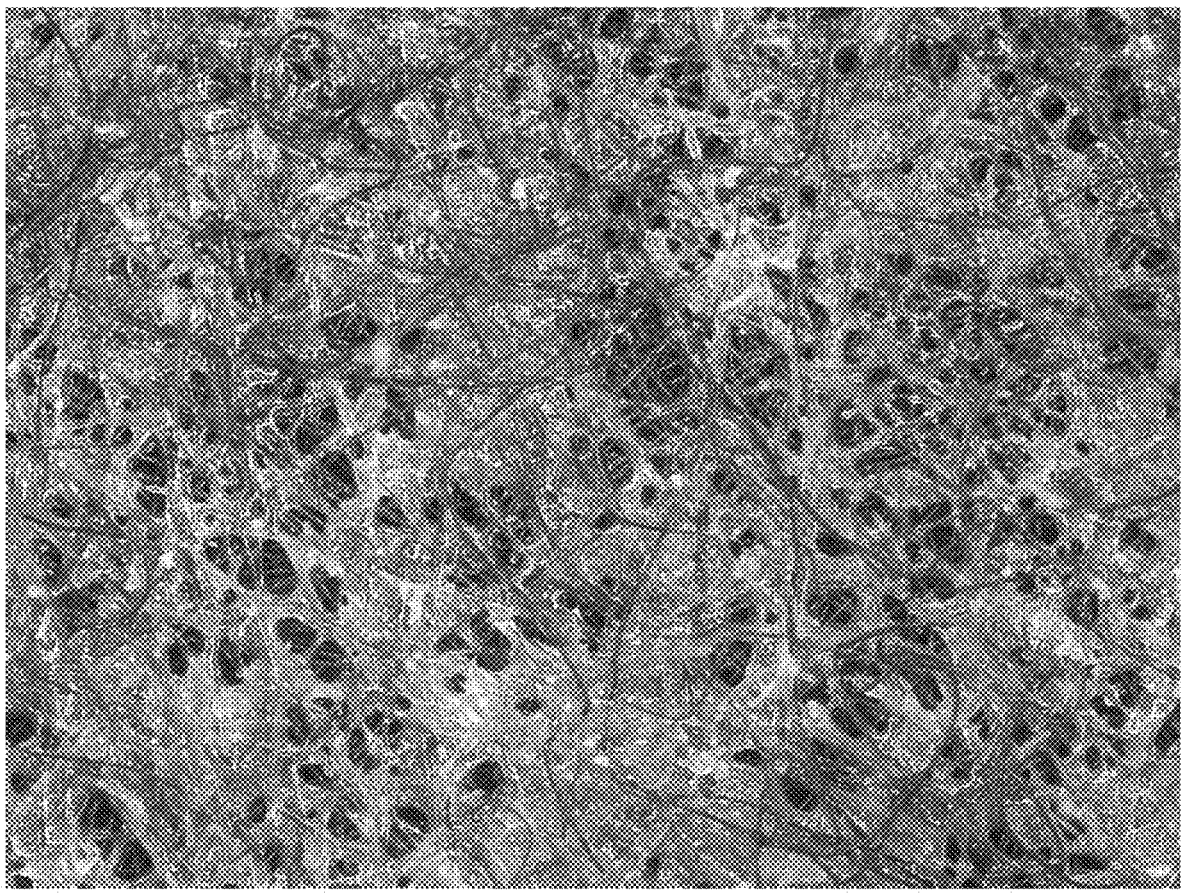
FIG. 6 is a photograph of a polypropylene resin layer, taken from its thickness direction using an optical microscope, after peeling a short fiber nonwoven fabric layer from a base material nonwoven fabric for molding of Comparative Example 4, using an optical microscope.

The short fiber nonwoven fabric layer was peeled from the prepared base material nonwoven fabric for molding of Comparative Example 4, and the PP resin layer found on the long fiber nonwoven fabric layer was observed from the thickness direction, using an optical microscope. As a result, in the PP resin, the size and interval of partially ruptured portions were random, and the PP resin was nonuniformly distributed and present on the long fiber nonwoven fabric layer (in other words, it did not have a width in a specific range, and was nonuniformly distributed). Further, the percentage of the area of the PP resin with respect to the main surface area of the long fiber nonwoven fabric layer was 60% or less. As FIG. 6, a photograph of the polypropylene resin layer, the photograph being taken from its thickness direction using an optical microscope, after peeling the short fiber nonwoven fabric layer from the base material nonwoven fabric for molding of Comparative Example 4, is shown.

The main surfaces of each prepared base material nonwoven fabric for molding were visually observed, and tried to confirm the occurrence of wrinkles. As a result of observation, in the "Wrinkles" column in Table 1, "Absence" was entered in the instance where wrinkles were unobserved on the main surfaces, and "Presence" was entered in the instance where wrinkles were observed on the main surfaces.

Next, with respect to these base material nonwoven fabric for molding, the peeling strength between the short fiber nonwoven fabric layer and the long fiber nonwoven fabric layer was measured to confirm the degree of temporary adhesion. The peeling strength is shown in Table 1 below, together with the constitution of the above-mentioned base material nonwoven fabrics for molding having different MFR.

The peeling strength was measured as follows.

Three strip-shaped test pieces (short side: 50 mm, long side: 130 mm, the long side direction coincides with the production direction of the measured object) were taken from each of the measured objects, and the short fiber nonwoven fabric layer and the long fiber nonwoven fabric layer were separated in the range of 80 mm from one short side to the other short side of each test piece. Each test piece prepared in this manner was subjected to a tensile tester (distance between chucks: 100 [mm]) manufactured by Instron, and the end of the separated short fiber nonwoven fabric layer was fixed on the one chuck, and the end of the separated long fiber nonwoven fabric layer was fixed on the other chuck. The chucks were pulled apart at a pulling speed of 200 [mm/min], and the maximum value of stress measured until the short fiber nonwoven fabric layer and the long fiber nonwoven fabric layer were completely separated from each other was determined.

The average of the maximum value of stress obtained in the measurement of each test piece was calculated, and it was regarded as the peeling strength of the measured object.

For items that could not be obtained, "-" was entered.

TABLE 1

|  | MFR [g/10 min.] | Wrinkles | Peeling strength of base material nonwoven fabric for molding [N/50 mm] | Evaluation result of peeling strength of base material nonwoven fabric for molding |
| --- | --- | --- | --- | --- |
| Example 1 | 20 | Absence | 1.45 | ○ |
| Example 2 | 25 | Absence | 1.98 | ○ |
| Example 3 | 30 | Absence | 2.06 | ○ |
| Comparative Example 1 | 11 | Absence | 0.23 | X |
| Comparative Example 2 | 15 | Absence | 0.53 | X |
| Comparative Example 3 | 9 | Presence | — | — |
| Comparative Example 4 | It is estimated that it is 20 or more and 100 or less | Presence | 1.20 | ○ |

In Table 1, the evaluation results of the peeling strength are denoted by "○" and "x" for each base material. High peeling strength was obtained in Examples 1 to 3 in which the MFR of the PP resin was relatively high, in comparison with Comparative Examples 1 and 2 in which the MFR was relatively low and temporary adhesion was carried out.

Since the temporary adhesive strength practically sufficient for handling is 1 [N/50 mm] or more, as a result of comparing Examples 1 to 3 and Comparative Examples 1 and 2, it is understood that it is sufficient for practical use if the MFR lower limit of the PP resin is at least 20 [g/10 min]. It is considered that since the fluidity of the PP resin employed in the Examples was set high during thermal pressing for carrying out the above-mentioned temporary adhesion, flow-solidification favorable for interlayer adhesion occurred and effective temporary adhesion could be achieved.

In connection with this, in Examples 1 to 3, peeling strength 1.2 times higher than compared with Comparative Example 4 was obtained, and the handling property was better. The reason for this is considered that, in the base material nonwoven fabrics for molding of Examples 1 to 3, the undrawn PP resin has a width in a specific range and is uniformly distributed and localized, and the area of the PP resin with respect to the main surface area of the long fiber nonwoven fabric layer is large.

Next, the above-mentioned base material nonwoven fabrics for molding of Examples 1 to 3 and Comparative Examples 1, 2, and 4 were, under common heat molding conditions, heated at 210 [° C.] using an INFRASTEIN heater (NGK INSULATORS, LTD., "INFRASTEIN" is a registered trademark of NGK INSULATORS, LTD. in Japan), and cooled to 30° C. using a flat plate pressing machine to form flat plate-shaped molded products under unifying molding conditions (clearance 5.0 mm, 30 kg/cm$^2$).

The main surfaces of each prepared molded product were visually observed, and the occurrence of wrinkles was confirmed. As a result of observation, in the "Wrinkles" column in Table 2, "Absence" was entered in the instance where wrinkles were unobserved on the main surfaces, and "Presence" was entered in the instance where wrinkles were observed on the main surfaces.

With respect to these molded products, the evaluation results of peeling strength and flexural modulus are shown in Table 2. The peeling strength was measured by the same method as described above, and the flexural modulus was calculated in accordance with the equation prescribed in section 9.3 of JIS K7171. In connection with this, a molded product having a high flexural modulus means a molded product highly resistant to force acting in the thickness direction. Therefore, the higher the flexural modulus, the more excellent the elasticity with resistance to external force.

TABLE 2

| | MFR [g/10 min.] | Wrinkles | Flexural modulus of molded product [MPa] | Peeling strength of molded product [N/50 mm] |
|---|---|---|---|---|
| Example 1 | 20 | Absence | 132 | 16.55 |
| Example 2 | 25 | Absence | 144 | 21.35 |
| Example 3 | 30 | Absence | 151 | 22.98 |
| Comparative Example 1 | 11 | Absence | 95 | 0.35 |
| Comparative Example 2 | 15 | Absence | 106 | 1.55 |
| Comparative Example 4 | It is estimated that it is 20 or more and 100 or less | Presence | 103 | 12.41 |

As can be understood from Table 2, in Examples 1 to 3 where interlayer adhesion was carried out with a PP resin having an MFR of 20 [g/10 min.] or more, which can realize workability at the temporary adhesion stage, the flexural modulus was higher than that of Comparative Examples 1 and 2, and the flexural modulus of each was 110 [MPa] or more. Further, comparing the peeling strength between the long fiber nonwoven fabric layer and the short fiber nonwoven fabric layer in the molded product, in Comparative Examples 1 and 2, only a low value of 1/10 or less of Examples 1 to 3 could be realized. The reason for this is considered that when following the heating applied in the base material nonwoven fabric for molding, a heat treatment at a higher temperature is applied during molding, and the undrawn polypropylene layer existing between the layers is re-fluidized, in Comparative Examples 1 and 2 employing low MFR, the PP resin hardly penetrates into the inside of the nonwoven fabric layers from the interface between the nonwoven fabric layers, and as a result, it is difficult to contribute to improvement of peeling strength.

In contrast to this, in Examples 1 to 3 to which the present invention is applied, the peeling strength was improved to about 10 times by the molding process, in comparison with the results of Table 1 with respect to the above-mentioned base material nonwoven fabrics for molding.

Further, in the molded product prepared using the base material nonwoven fabric for molding of Comparative Example 4, the peeling strength was lower than that of Examples 1 to 3. The reason for this is considered that the size and interval of partially ruptured portions of the PP resin in Comparative Example 4 were random, and the PP resin was nonuniformly distributed and present, and further, the area of the PP resin with respect to the main surface area of the long fiber nonwoven fabric layer was small, and as a result, the PP resin did not contribute enough to improve the peeling strength.

Further, in the molded product prepared using the base material nonwoven fabric for molding of Comparative Example 4, the flexural modulus was as low as that of the Comparative Examples 1 and 2, and it was inferior in elasticity. The reason for this is considered that since it was prepared using the base material nonwoven fabric for molding with wrinkles, the molded product had wrinkles on the main surfaces, and in addition, the PP resin layer existing between the long fiber nonwoven fabric layer and the short fiber nonwoven fabric layer formed randomly, and was nonuniformly distributed and present, and as a result, the interlayer adhesion became nonuniform.

Figure 3:
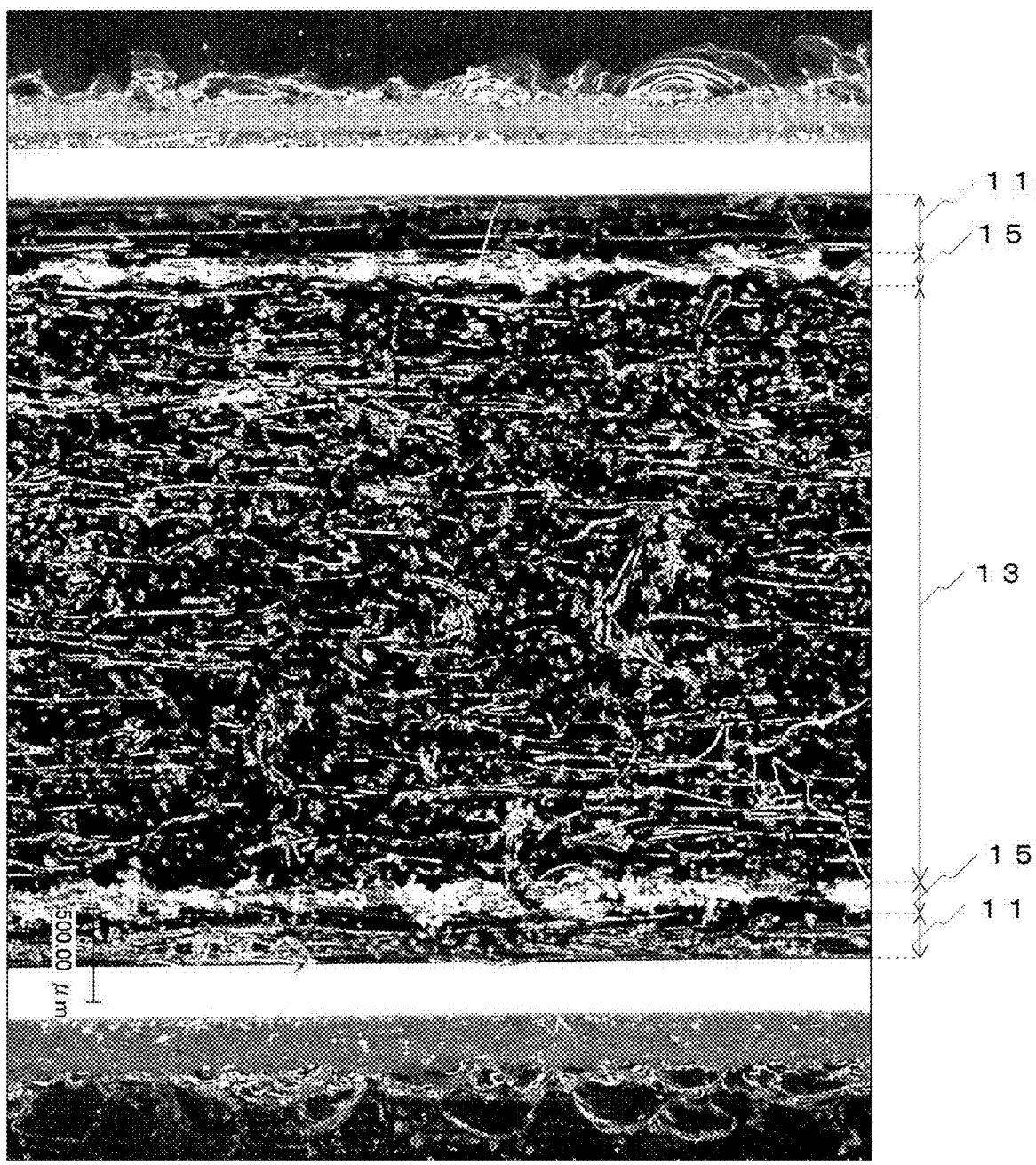
FIG. 3 is a photograph of the cross-section of a molded product prepared using the base material nonwoven fabric for molding of Example 2, taken using an optical microscope.

Next, the result of observing the cross-section of the molded product prepared using the base material nonwoven fabric for molding of Example 2, in a similar fashion to the method described for FIG. 2, is shown in FIG. 3. In this shooting, the molded product was sandwiched in a pressure-free state, and the shooting was carried out at approximately 50 times magnification. As can be understood from the comparison of FIG. 2 described above and FIG. 3, since it undergoes high-temperature heat molding conditions as compared with the instance of temporary adhesion, the thickness of the molded product is thinner than that of the base material. Further, it was confirmed that, by heat molding, the undrawn polypropylene layer 15 which had been temporarily adhered between the layers was flow-solidified, and was uniformly distributed and localized with a width of 200-300 [μm], and the PP resin penetrated into both the long fiber nonwoven fabric layer 11 and the short fiber nonwoven fabric layer 13, which constituted the interface. The degree of localization of the undrawn polypropylene layer in these figures was clearly correlated with the improvement of peeling strength, as shown in Tables 1 and 2 described above.

Example 4

A complex type antioxidant of phosphorus and phenol was blended with the PP resin employed in Example 3, so that the percentage of the solid content mass of the antioxidant with respect to the solid content mass of the PP resin was 3 mass %. A base material nonwoven fabric for molding was obtained in a similar fashion to that of Example 3, except that the PP resin blended with the antioxidant prepared in this manner was used as the PP resin.

In the base material nonwoven fabric for molding prepared in Example 4, similarly to Example 3, the flow-solidified undrawn polypropylene layer was localized in the vicinity of the interface between the long fiber nonwoven fabric layer and the short fiber nonwoven fabric layer.

Further, the base material nonwoven fabric for molding of Example 4 was used to prepare a flat plate-shaped molded product, in a similar fashion to the method explained in Examples 1 to 3.

With respect to the base material nonwoven fabrics for molding in Examples 3 and 4 prepared by the method described above, various physical properties thereof were evaluated and summarized in Table 3.

TABLE 3

|  | MFR [g/10 min.] | Wrinkles | Peeling strength of base material nonwoven fabric for molding [N/50 mm] | Evaluation result of peeling strength of base material nonwoven fabric for molding |
| --- | --- | --- | --- | --- |
| Example 3 | 30 | Absence | 2.06 | ○ |
| Example 4 | 30 | Absence | 1.96 | ○ |

Further, with respect to the flat plate-shaped molded products prepared using the base material nonwoven fabrics for molding in Examples 3 and 4, various physical properties thereof were evaluated and summarized in Table 4.

In the "Heat resistance" column of Table 4, the results obtained by subjecting the flat plate-shaped molded products to the following evaluation method are described.

(Evaluation method of heat resistance for molded product)

1. The flat plate-shaped molded product was placed in a constant temperature oven and allowed to stand in 160° C. atmosphere for 168 hours.

2. The flat plate-shaped molded product exposed to 160° C. atmosphere was taken out from the constant temperature oven and allowed to stand at room temperature atmosphere. It was naturally cooled to room temperature (23° C.).

3. The incidence of interlayer peeling between the long fiber nonwoven fabric layer and the short fiber nonwoven fabric layer in the naturally cooled flat plate-shaped molded product was visually confirmed.

It was evaluated that the molded product which did not show the occurrence of interlayer peeling was excellent in heat resistance, and it was denoted by "○" in Table 4. It was evaluated that the molded product which showed the occurrence of interlayer peeling was inferior in heat resistance, and it was denoted by "x" in Table 4.

TABLE 4

|  | MFR [g/10 min.] | Wrinkles | Flexural modulus of molded product [MPa] | Peeling strength of molded product [N/50 mm] | Heat resistance of molded product |
| --- | --- | --- | --- | --- | --- |
| Ex. 3 | 30 | Absence | 151 | 22.98 | X |
| Ex. 4 | 30 | Absence | 150 | 22.84 | ○ |

INDUSTRIAL APPLICABILITY

The present invention can be used as a base material nonwoven fabric for molding, and a molded product thereof, suitable for underbody shielding material, which is attached to the lower part of the body, tire housing, or the like, of a car.

REFERENCE SIGNS LIST

11: Long fiber nonwoven fabric layer (made of polyester-based resin)
13: Short fiber nonwoven fabric layer (made of polyester-based resin)
15: Undrawn polypropylene layer (localized)

The invention claimed is:

1. A base material nonwoven fabric for molding in a predetermined shape by heat molding, said base material nonwoven fabric for molding having a two-layer structure of a long fiber nonwoven fabric layer comprising at least a polyester resin and a short fiber nonwoven fabric layer comprising a polyester resin, wherein a flow-solidified undrawn polypropylene layer is localized in the vicinity of an interface between the long fiber nonwoven fabric layer and the short fiber nonwoven fabric layer, and wherein the undrawn polypropylene layer is a polypropylene resin having an MFR (melt mass flow rate) of 20 [g/10 min.] or more (230 [° C.], 2.16 [Kg]) measured according to JIS K6921-2.

2. A molded product prepared by heat-molding the base material nonwoven fabric for molding according to claim 1, wherein a flexural modulus defined in JIS K7171 is 110 [MPa] or more.

\* \* \* \* \*